United States Patent
Schlegel et al.

(10) Patent No.: US 12,459,069 B2
(45) Date of Patent: Nov. 4, 2025

(54) SUCTION DEVICE FOR A RELEASABLE CONNECTION TO A HAND-HELD POWER TOOL

(71) Applicant: Robert Bosch GmbH, Stuttgart (DE)

(72) Inventors: Fritz Schlegel, Stuttgart (DE); Holger Froehling, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 68 days.

(21) Appl. No.: 18/450,898

(22) Filed: Aug. 16, 2023

(65) Prior Publication Data

US 2024/0075572 A1 Mar. 7, 2024

(30) Foreign Application Priority Data

Sep. 2, 2022 (DE) ...................... 10 2022 209 164.7

(51) Int. Cl.
*B25D 17/20* (2006.01)
*B23Q 11/00* (2006.01)

(52) U.S. Cl.
CPC ...... *B23Q 11/0046* (2013.01); *B23Q 11/0071* (2013.01); *B25D 17/20* (2013.01)

(58) Field of Classification Search
CPC ...................... B23Q 11/0046; B23Q 11/0071; B25D 17/20; B25D 17/00; B25F 5/02
USPC ........ 173/81, 90, 140–141, 162.1, 197, 198, 173/213, 168–171
See application file for complete search history.

(56) References Cited

U.S. PATENT DOCUMENTS

| | | | | |
|---|---|---|---|---|
| 5,467,835 A | * | 11/1995 | Obermeier | E21B 21/015 173/75 |
| 8,424,615 B2 | * | 4/2013 | Baumann | B25F 5/021 173/217 |
| 2008/0202781 A1 | * | 8/2008 | Nishikawa | B23Q 11/0071 408/124 |
| 2012/0234570 A1 | * | 9/2012 | Machida | B23Q 11/0046 173/197 |
| 2015/0076205 A1 | * | 3/2015 | Zergiebel | A61B 17/07207 227/175.1 |
| 2019/0030622 A1 | * | 1/2019 | Carlson | B25F 5/026 |
| 2020/0156199 A1 | * | 5/2020 | Richards | B23Q 11/0071 |
| 2021/0237249 A1 | * | 8/2021 | Fischer | B25F 5/02 |
| 2023/0089745 A1 | * | 3/2023 | Bryan | H01M 50/583 429/72 |

(Continued)

FOREIGN PATENT DOCUMENTS

| | | | | |
|---|---|---|---|---|
| BE | 1009324 A6 | * | 2/1997 | ......... B23Q 11/0046 |
| DE | 202017100783 U1 | * | 4/2017 | ......... B23Q 11/0046 |
| DE | 10 2017 201 567 A1 | | 8/2018 | |

(Continued)

*Primary Examiner* — Robert F Long
(74) *Attorney, Agent, or Firm* — Maginot, Moore & Beck LLP (57) ABSTRACT

A suction device for a releasable connection to a hand-held power tool, in particular to a hammer drill, includes a housing with a drive unit arranged in the housing for generating a suction flow, and at least one locking unit for a mechanical coupling with the hand-held power tool. The coupling includes at least one locking element for direct locking with the hand-held power tool and at least one actuating element used to release the lock of the at least one locking element. The actuating element and/or the locking element are arranged at least partially adjacent the drive unit.

20 Claims, 6 Drawing Sheets

(56) References Cited

U.S. PATENT DOCUMENTS

2023/0264312 A1* 8/2023 Richards ................. A47L 9/122
                                                              173/198

FOREIGN PATENT DOCUMENTS

| DE | 10 2017 203 218 A1 | 8/2018 | | |
|----|--------------------|--------|---|---|
| DE | 21 2017 000 114 U1 | 1/2019 | | |
| DE | 10 2020 207 395 A1 | 12/2021 | | |
| EP | 4039144 A1 * | 8/2022 | .......... | A47L 11/4075 |

* cited by examiner

SUCTION DEVICE FOR A RELEASABLE CONNECTION TO A HAND-HELD POWER TOOL

This application claims priority under 35 U.S.C. § 119 to application no. DE 10 2022 209 164.7, filed on Sep. 2, 2022 in Germany, the disclosure of which is incorporated herein by reference in its entirety.

BACKGROUND

A suction device has already been proposed for a releasable connection to a hand-held power tool, in particular to a hammer drill having a housing with a drive unit arranged in the housing for generating a suction flow, and having at least one locking unit for a mechanical coupling with the hand-held power tool, which coupling comprises at least one locking element for direct locking with the hand-held power tool and at least one actuating element for releasing the lock of the at least one locking element.

Furthermore, a suction device for a releasable connection to a hand-held power tool, in particular to a hammer drill, is already known from DE 10 2017 201 567 A1.

SUMMARY

The disclosure relates to a suction device for a releasable connection to a hand-held power tool, in particular to a hammer drill having a housing with a drive unit arranged in the housing for generating a suction flow, and having at least one locking unit for a mechanical coupling with the hand-held power tool, which coupling comprises at least one locking element for direct locking with the hand-held power tool and at least one actuating element for releasing the lock of the at least one locking element.

It is proposed that the actuating element and/or the locking element be arranged at least partially adjacent the drive unit. At least the actuating element is preferably arranged at least partially adjacent the drive unit. Preferably, at least the actuating element is arranged completely adjacent the drive unit. The actuating element is preferably coupled to the locking element. Particularly preferably, the actuating element is directly coupled to the locking element, whereby a movement of the actuating element is directly transmitted to the locking element.

In this context, a "suction device" is in particular intended to mean a retrofittable device, in particular a suction means, for removing dust material at the location of use of the hand-held power tool during operation of the hand-held power tool. Preferably, the suction device comprises a dust collection box for receiving the dust material. The suction device is in particular formed by an optional additional module. The suction device is intended in particular for direct connection to the hand-held power tool. Preferably, the suction device does not have its own power supply and is powered by the hand-held power tool via an electrical interface. However, it would also be conceivable for the suction device to have its own power supply, in particular in the form of a battery interface. A "hand-held power tool" is intended in particular to mean a workpiece-processing machine, advantageously a drilling machine, a drilling and/or impact hammer, a saw, a planer, a screwdriver, a milling machine, a grinder, an angle grinder, a gardening tool, and/or a multi-function tool.

The drive unit is in particular formed by a fan unit. The drive unit in particular comprises an electric motor and a fan element. The electric motor is provided to drive the fan element to generate an air flow. Preferably, the fan element is in particular arranged in a suction channel passage of the suction device. Preferably, the fan element is arranged in particular along a direction of flow from the suction jaw of the suction device to the dust collection box of the suction device behind the dust collection box. However, a different arrangement of the fan element that appears to be advantageous to a skilled person would also be conceivable.

In this context, a "locking unit" is in particular understood to mean a unit for a releasable mechanical coupling of the suction device to the hand-held power tool. Preferably, the locking unit is provided to engage with at least one locking element in an interlocking manner within a recess in the hand-held power tool. Preferably, the locking element can be formed by a rigid spring-loaded element or by a latching element. Preferably, the locking element is in particular formed by a pivotally supported positive locking element with a locking hook. An "operating element" is in particular intended to mean an element that is provided to be contacted by an operator directly during operation and to be applied with an actuating force, whereby the actuating force is mechanically passed to the locking element for actuation of the locking unit.

In this context, "at least partially adjacent" is in particular intended to mean that at least one straight line exists, which extends perpendicular to a main extension plane of the suction device and which intersects both the actuating element and/or the locking element and the drive unit. A "main extension plane" of a structural unit is in particular intended to mean a plane, which is parallel to a largest side surface of a smallest notional cuboid, which just completely encloses the structural unit, and in particular runs through the midpoint of the cuboid. The term "provided" is in particular intended to mean specifically programmed, designed, and/or equipped. The phrase "an object being provided for a specific function" is particular intended to mean that the object fulfills and/or performs this specific function in at least one application and/or operating state.

In particular, an advantageously compact design can be achieved by the design of the suction device according to the disclosure. In particular, an axial design length of the suction device can be advantageously minimized.

Furthermore, it is proposed that the locking element and the actuating element be integrally formed and together form a locking lever. Preferably, the locking element and the actuating element together form a pivotable locking lever, whereby the actuating element is arranged at a first end of the locking lever, and a locking hook of the locking element is arranged at an end opposite the first end. The locking lever is in particular formed by a lever, which can be pivoted about a pivot axis and which can be actuated at one end and is provided for locking at another end. The actuating element is in particular used to release the lock of the locking lever. Preferably, the actuating element is provided in particular to be actuated by means of pushing, whereby the actuating element moves on a circular path around the pivot axis of the locking lever when actuated. However, a different design for the actuating element which a skilled person regards as advantageous would also be conceivable. The term "integral" is in particular understood to mean connected at least by substance-to-substance bonding, e.g., by a welding process, an adhesive bonding process, a process of molding on and/or another process that appears advantageous to the skilled person skilled, and/or advantageously formed in one piece, e.g., by production from a casting and/or by production in a single- or multi-component injection molding process and advantageously from a single blank. In particular, the number of components can be minimized as a result. Furthermore, a direct initiation of force from the actuating element to the locking element can preferably be achieved.

Furthermore, it is proposed that the locking unit comprise a further locking element for direct locking with the handheld power tool and a further actuating element for release of the locking element, whereby the further locking element and the further actuating element are integrally formed and together form a further locking lever. Preferably, the locking lever and the further locking lever are identical or at least mirror symmetrical. Preferably, the actuating element and the further actuating element need to be actuated simultaneously in order to release the locking unit of the actuating element. Doing so can in particular achieve a high degree of safety. In particular, accidental release of the suction device can be avoided. Furthermore, advantageously reliable locking can be achieved by the further locking lever. In particular, a double-locked clip mechanism can be provided that independently fixes the suction device to the hand-held power tool. Furthermore, in particular, a self-locking locking unit can be provided in which, when the suction device and the hand-held power tool are brought together, the locking elements are automatically pushed apart.

It is further proposed that the drive unit be arranged at least partially between the locking lever and the further locking lever. Preferably, the locking lever and the further locking lever are arranged opposite each other, in particular on an inner wall of the housing. Preferably, the drive unit is arranged between the actuating element and the further actuating element. Preferably, at least one straight line exists which extends perpendicular to a main extension plane of the suction device and which intersects the locking lever, in particular the actuating element, subsequently the drive unit and then the further locking lever, in particular the further actuating element. Preferably, the locking lever and the further locking lever are arranged at the same position when viewed perpendicular to the main extension plane of the suction device. The locking lever and the further locking lever are arranged in a mirror-symmetrical manner on opposite sides of the main extension plane of the suction device. In this way, an advantageously compact design can be achieved. In particular, an axial design length of the suction device can be kept advantageously low. Furthermore, advantageously reliable locking can be enabled.

It is further suggested that the locking unit comprises at least two spring elements which pretension the locking lever and the further locking lever independently of each other. Preferably, the spring elements are each provided to hold the locking lever and the further locking lever respectively in a locking position, wherein a spring force of the spring elements must be overcome by means of the actuating element and the further actuating element when the lock is released. Preferably, the spring elements are arranged between an inner wall of the housing and the locking lever and the further locking lever, respectively. The spring elements are in particular each formed by a compression spring, in particular a coil spring. However, a different design for the spring elements which a skilled person regards as advantageous would also be conceivable. A "spring element" is in particular understood to mean a macroscopic element having at least one extension which, in a normal operating state, can be elastically changed by at least 10%, in particular by at least 20%, preferably by at least 30%, and particularly advantageously by at least 50%, and which in particular produces a drag, which is dependent on a change in the extension, is preferably proportional to the change, and counteracts the change. An "extension" of an element is in particular understood to mean a maximum distance between two points of a perpendicular projection of the element onto a plane. The term "macroscopic element" is in particular understood to mean an element having an extension of at least 1 mm, in particular at least 5 mm, and preferably at least 10 mm. Advantageously reliable locking can be enabled thereby.

It is further proposed that the locking lever comprises an actuating direction in which the actuating element is provided to release the lock for actuation, and the further locking lever comprises a further actuating direction in which the further actuating element is provided to release the lock for actuation, the further actuating direction being at least substantially opposite to the actuating direction. Preferably, the actuating element and the further actuating element need to be moved towards each other in order to release the locking unit. Preferably, the actuating element and the further actuating element need to be compressed in order to release the locking unit. The actuating direction and the further actuating direction are each aligned at least substantially perpendicular to the main extension plane of the suction device. In this context, the term "substantially perpendicular" is in particular understood to mean an orientation of a direction relative to a reference plane, whereby the direction and the reference plane enclose an angle of 90°, and the angle has a deviation of in particular less than 8°, advantageously less than 5°, and particularly advantageously less than 2°. Doing so can in particular achieve a high degree of safety. In particular, accidental release of the suction device can be avoided. Further, convenient release of the locking unit can thereby be achieved. The actuating elements are in particular one-handed with a clamp handle or pincer grip accessible around the entire suction device. The suction device is then always under control, while the control elements are accessible.

It is further proposed that the suction device comprise a center of gravity, the at least one actuating element being arranged in a region near the center of gravity. Preferably, at least a part of the actuating element, in particular a geometrical center point of the actuating element, is arranged in said region near the center of gravity. Preferably, the actuating element and the further actuating element are arranged in a region near the center of gravity. In this context, a "region near" is in particular understood to mean a spherical spatial region, the center of which is located the center of gravity of the extraction device, whereby the spherical region has a radius of maximum 7 cm, preferably a maximum of 5 cm, and more preferably a maximum of 3 cm. An advantageously compact design can thereby be achieved. In particular, it can be achieved that the suction device can be advantageously held on the at least one actuating element, since the suction device is thereby held close to a center of gravity. Another advantage is that the suction device can be grasped with the enclosing hand and is thus firmly gripped, while the actuating elements of the lock are accessible. The center of gravity of the suction device is held in the operator's hand, thus ensuring that the direction of pull of both hands is in one axis. Given the necessary dual actuation, an accidental release of the suction device from the hand-held power tool by the one-sided, in particular also accidental, activation of the locking unit is not possible. The locking unit is positioned to be flush with the handle of the hand-held power tool, thus enabling very ergonomic activation and handling.

It is further proposed that the at least one locking element be pivotally supported around at least one rotating shaft in the housing. Preferably, the at least one locking element is pivotally supported on an inner side of the housing around a rotating shaft in the housing. It is further proposed that the rotating shaft be formed integrally with the locking element. Preferably, the rotating shaft forms part of the locking lever. Preferably, the rotating shaft is in particular formed by a cylindrical component which is provided for rotational support. In this way, an advantageous storage and arrangement of the locking element can in particular be achieved.

It is further proposed that the suction device comprise a rotating shaft receptacle arranged on the housing for rotatably receiving the rotating shaft, which comprises at least one latching element for fixation of the rotating shaft. Preferably, the rotating shaft receptacle comprises at least two latching elements, which are provided for at least partially overlapping the rotating shaft from at least two sides. Preferably, the rotating shaft is rotatably supported between the latching elements. In this context, a "latching element" is in particular understood to mean a spring-resilient means for producing a latching connection and which is intended to be elastically deflected during installation. Preferably, the rotating shaft receptacle is arranged on an inner side of the housing. Preferably, the rotating shaft receptacle is formed integrally with the housing. Preferably, the suction device further comprises a further rotating shaft receptacle for receiving a further rotating shaft of the further locking lever. Preferably, the rotating shaft receptacle and the further rotating shaft receptacle are each arranged opposite each other in the housing.

Alternatively or additionally, it would also be conceivable that the at least one rotating shaft is secured in the housing by means of additional mechanical locks, e.g., screws, brackets, sheets and/or insert elements, between the locking levers.

It is further proposed that the housing, in an actuating plane, which is subtended by a main extension direction of the locking lever and a main extension direction of the further locking lever, comprises a gripping length between the actuating element and the further actuating element, which gripping length is a maximum of 170 mm. Preferably, the gripping length is a maximum of 160 mm, preferably a maximum of 155 mm. Preferably, the gripping length is at least 120 mm, preferably at least 130 mm, and more preferably at least 140 mm. In this context, a "gripping length" is in particular understood to mean the length of a line following the outer contour of the housing, which extends from the actuating element to the further actuating element in the actuating plane, in particular along the shortest path. Preferably, an operator's hand rests against the housing when the locking unit is released along said line. Preferably, the gripping length defines a required span from a thumb tip to an index finger tip of a hand of the operator. Preferably, the housing is rounded in an area of the line, wherein in particular the housing in the gripping region in the actuating plane has a diameter of less than 60 mm, preferably less than 55 mm, and more than 40 mm, preferably more than 45 mm. In particular, an advantageous gripping capability of the suction device can be achieved as a result. In particular, a advantageously high percentile can be achieved with respect to a gripping capability by a user, in particular a percentile of 95% of the users. In particular, the best possible accessibility and gripping of the suction device can be enabled.

Furthermore, the disclosure proceeds from a hand-held power tool system having a hand-held power tool and with the suction device. It is proposed that the hand-held power tool comprise at least one housing having at least one receptacle for a locking receptacle of the at least one locking element of the locking unit of the suction device. Preferably, the at least one receptacle is arranged on a front side of the hand-held power tool and is opened at least partially to one side. Preferably, the hand-held power tool comprises a receptacle and a further receptacle for a locking receptacle of the further locking element. The at least one receptacle in particular forms a locking wall, which is gripped behind by the locking hook of the locking element in a locked state. Preferably, the at least one receptacle is opened substantially towards one side. In particular, an advantageous hand-held power tool system can thereby be provided. In particular, moving parts on the hand-held power tool can be omitted from locking the suction device.

Furthermore, it is proposed that the suction device be couplable to the hand-held power tool in a defined connection direction, the connection direction extending at least substantially parallel to a tool rotational axis of the hand-held power tool. In particular, an advantageous hand-held power tool system can thereby be provided. Advantageously simple mountability can in particular be achieved.

It is further proposed that the suction device comprise an actuating plane, which is subtended by a main extension direction of the locking lever and a main extension direction of the further locking lever and which extends through a handle of the hand-held power tool. A "main extension direction" of an object is in particular understood to mean a direction which runs parallel to a longest edge of a smallest geometrical cuboid, which just completely encloses the object, and which extends through a geometric center of the object. Preferably, the actuating plane extends perpendicular to the main extension plane of the suction device. Preferably, an axis of the handle of the hand-held power tool extends in the main extension plane of the suction device and at least substantially perpendicular to the actuating plane. Preferably, the actuating plane extends parallel to the tool rotational axis of the hand-held power tool. The locking unit is therefore in particular positioned so that it is in alignment with the handle of the hand-held power tool and thus enables very ergonomic activation and handling. In particular, an advantageously high ease of use can be achieved.

It is further proposed that the hand-held power tool comprise an actuating plane, which extends parallel to the actuating plane of the suction device and which extends through an operating switch of the hand-held power tool, whereby a minimum distance between the actuating plane of the hand-held power tool and the actuating plane of the suction device is less than 150 mm. Preferably, a minimum distance between the actuating plane of the hand-held power tool and the actuating plane of the suction device is less than 100 mm and more than 50 mm. Preferably, a minimum distance between the actuating plane of the hand-held power tool and the actuating plane of the suction device is at least approximately 80 mm. Preferably, the actuating plane of the hand-held power tool extends perpendicular to a main extension plane of the hand-held power tool. Preferably, an axis of the handle of the hand-held power tool extends in the main extension plane of the hand-held power tool and at least substantially perpendicular to the actuating plane of the hand-held power tool. Preferably, the actuating plane of the hand-held power tool machine extends parallel to the tool rotational axis of the hand-held power tool.

The hand-held power tool system according to the disclosure is hereby not intended to be limited to the application and embodiment described hereinabove. In order to fulfill a functionality described herein, the suction device and hand-held power tool according to the disclosure can in particular comprise a number of individual elements, components, and units that deviates from a number mentioned herein. Moreover, regarding the ranges of values indicated in this disclosure, values lying within the aforementioned limits are also intended to be considered as being disclosed and usable as desired.

BRIEF DESCRIPTION OF THE DRAWINGS

Further advantages will become apparent from the following description of the drawing. The drawings illustrate an advantageous embodiment of the disclosure. The drawings, the description, and the claims contain numerous features in combination. A skilled person will appropriately also consider the features individually and combine them into additional advantageous combinations.

Shown are.

DETAILED DESCRIPTION

Figure 1:
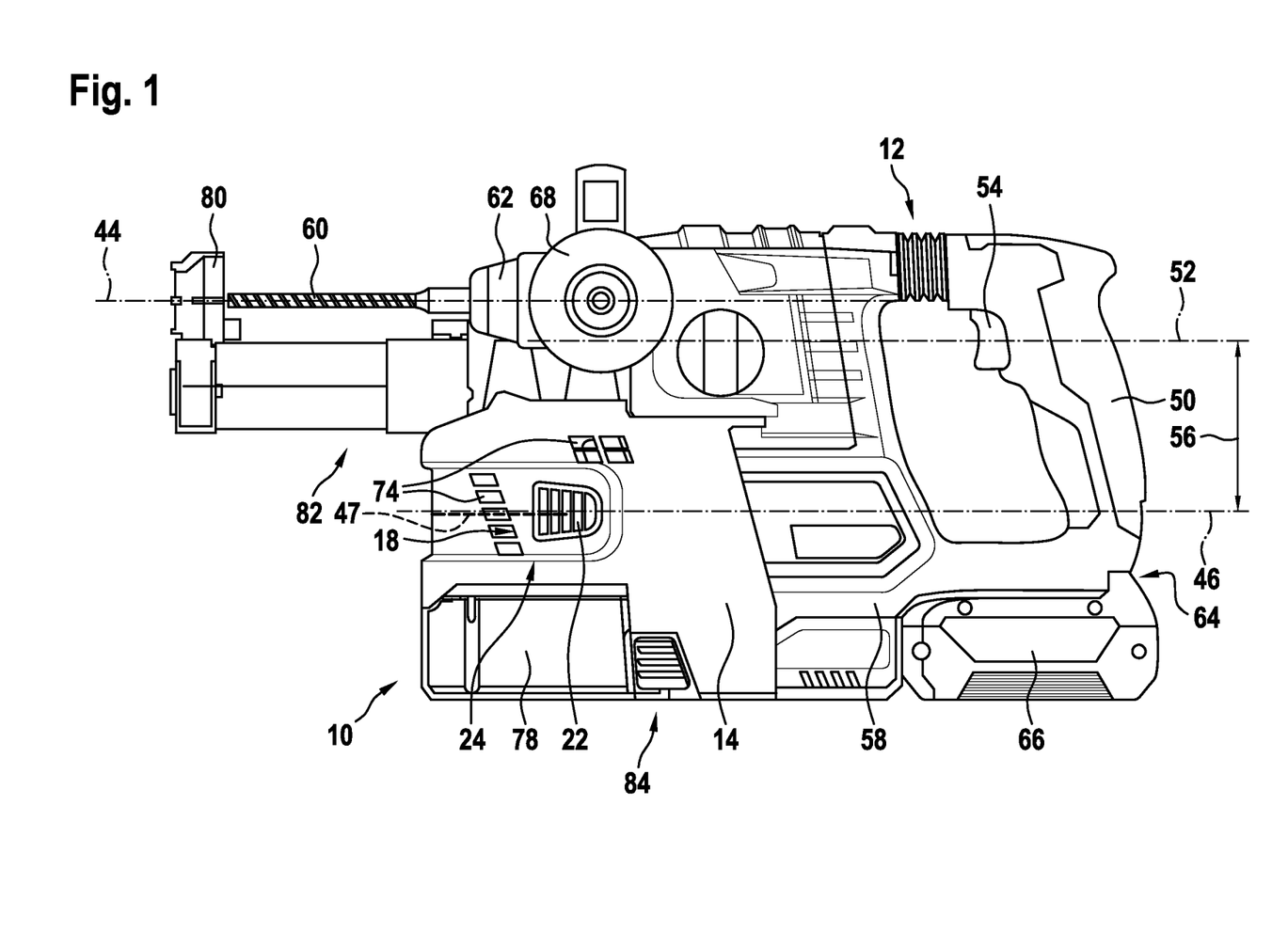
FIG. 1 a hand-held power tool system having a hand-held power tool and a suction device according to the present disclosure in a coupled state in a schematic representation, FIG. 2 the hand-held power tool system having the hand-held power tool and the suction device according to the disclosure in a separate state in a schematic partial section representation, FIG. 3 the suction device according to the present disclosure having a housing and with a locking unit in a schematic representation, FIG. 4 a partial section of the hand-held power tool system with the hand-held power tool and the suction device according to the disclosure comprising the locking unit with a locking element and a further locking element in a schematic cross-sectional view along a cross-sectional line IV-IV, FIG. 5 a partial section of the suction device according to the disclosure with the locking element and an actuating element of the locking unit in a locking position in a schematic cross-sectional view along the cross-sectional line IV-IV, FIG. 6 a partial section of the suction device according to the disclosure with the locking element and the actuating element of the locking unit in a locking position in a schematic cross-sectional view along the cross-sectional line W-W, FIG. 7 the locking unit of the suction device according to the disclosure having the locking element, a further locking element, with the actuating element and with a further actuating element in a schematic representation, and FIG. 8 a partial perspective view of the suction device according to the disclosure showing the gripping length between the actuating element and the further actuating element.

In FIG. 1, a side view of a hand-held power tool system including a hand-held power tool 12 and a suction device 10 releasably connected to the hand-held power tool 12 is shown. The hand-held power tool 12 comprises a housing 58, which in particular is designed as an outer housing. As an example, the hand-held power tool 12 is designed as a drill hammer. However, a different design of the hand-held power tool 12 that appears to be useful to a skilled person would also be conceivable, e.g., as a drilling machine, in particular as an impact drill. The hand-held power tool 12 comprises a drive unit (not further shown), which is designed to drive an insertion tool 60 in a rotating and/or percussive manner via a gearbox and impact mechanism unit (not further shown). For this purpose, the drive unit of the hand-held power tool 12 comprises an electric motor, whose rotational axis is arranged substantially perpendicular to a tool rotational axis 44 of the hand-held power tool 12. The gearbox and impact mechanism unit comprises an impact mechanism, in particular a pneumatic impact mechanism. The insertion tool 60 is received by the hand-held power tool 12 via a toolholder 62. The toolholder 62 is, e.g., designed as an interchangeable drill chuck. It is also contemplated, however, that toolholder 62 can be designed as a non-interchangeable fixed drill chuck. The hand-held power tool 12 comprises an operating switch 54, and the hand-held power tool 12 can be turned on or off via actuation of the operating switch 54. The hand-held power tool 12 comprises a power supply unit 64 designed to power the hand-held power tool 12. The power supply unit 64 comprises a hand-held power tool battery pack 66 releasably connected to the housing 58 of the hand-held power tool 12. The housing 58 comprises a handle 50 on which the operating switch 54 is arranged. To ensure a secure grip of the hand-held power tool 12, the hand-held power tool 12 comprises an additional handle 68 that is releasably connected to the housing 58.

The suction device 10 is provided to be releasably connected to the hand-held power tool 12. The suction device 10 comprises a housing 14. The housing 14 is releasably connected to the hand-held power tool 12. Furthermore, the suction device 10 comprises a drive unit 16 arranged in the housing 14 for generating a suction flow. The drive unit 16 is formed by a fan unit. The drive unit 16 comprises an electric motor 70 and a fan element 72 rotatably supported within the housing 14 (see FIG. 2). In the area of the drive unit 16, in particular in the area of the electric motor 70 and in the area of the fan element 72, air vents 74 are arranged through which air can enter and/or exit the housing 14. Furthermore, the suction device 10 comprises a suction head 80, an air channel 76, and a dust collection box 78. During operation of the suction device 10, the drive unit 16 is designed to generate an air flow that transports dust material from the place of installation of the insertion tool 60 into the dust collection box 78 via the air channel 76 (see FIG. 2). During operation of the suction device 10, the air flow enters the suction device 10 via the suction head 80 and is transported into the dust collection box 78 via the air channel 76. The distance of the suction head 80 from the hand-held power tool 12, in particular from the toolholder 62 of the hand-held power tool 12, is designed to be variably adjustable via a telescopic unit 82 of the suction device 10. The telescopic unit 82 partially forms the air channel 76. The dust collection box 78 is releasably connected to the housing 14 of the suction device 10 by means of a first fastening unit 84. The dust collection box 78 is connected to the housing 14 of the suction device 10, in particular by pushing and/or pivoting the dust collection box 78 into the housing 14 of the suction device 10, the pushing-in substantially being performed in a direction perpendicular to the tool rotational axis 44 of the hand-held power tool 12, or by pivoting around a pivot point. Furthermore, the suction device 10 comprises a dust filter 86 arranged in an air flow between the dust collection box 78 and the fan element 72. The dust filter 86 is used to separate the dust material into the dust collection box 78. Along an air flow through the suction device 10, the suction head 80 is followed by the air channel 76, which in turn opens out into the dust collection box 78 (not shown). Dust collection box 78 is followed by the dust filter 86 and then the fan element 72. From the fan element 72, the cleaned air is blown out of the suction device 10 via the air vents 74. Furthermore, the drive unit 16 is positioned spatially between the air channel 76 and/or the telescopic unit 82 and the dust collection box 78. A rotational axis of the electric motor 70 is inclined relative to an axis of the telescopic unit 82. The rotational axis of the electric motor 70 is inclined at an angle between 20° and 50° relative to an axis of the telescopic unit 82 and/or the tool rotational axis 44 of the hand-held power tool 12.

The hand-held power tool 12 comprises a power and/or data interface 88. The suction device 10 comprises a corresponding power and/or data interface 88 (not further shown). Via the power and/or data interface 88, the suction device 10 can be supplied with energy by the hand-held machine tool 12 and can also be controlled. Preferably, the hand-held power tool 12 can control or regulate a suction operation of the suction device 10. However, it would also be conceivable that the suction device 10 comprises its own power supply, in particular in the form of a battery interface.

Figure 3:
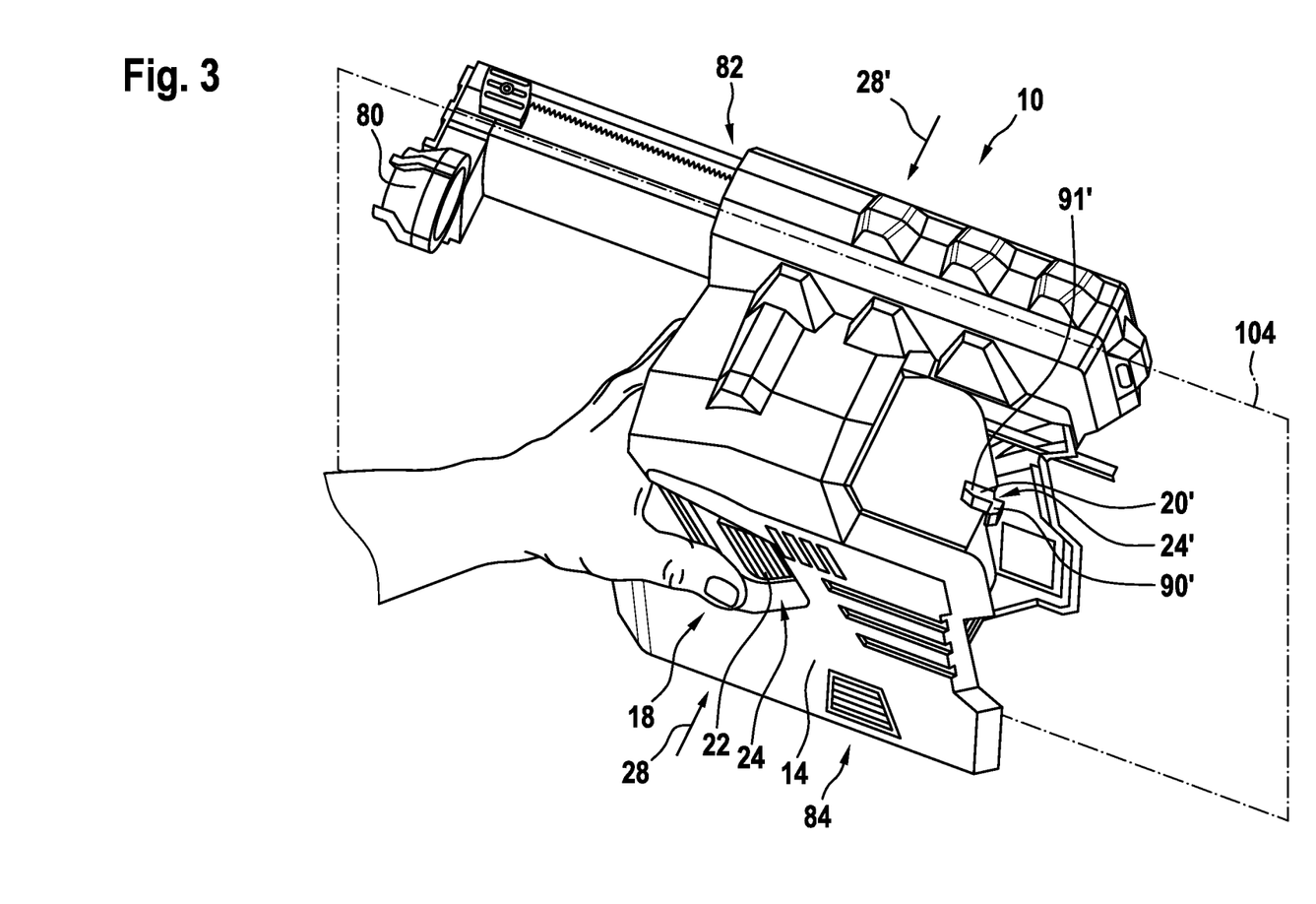
Figure 4:
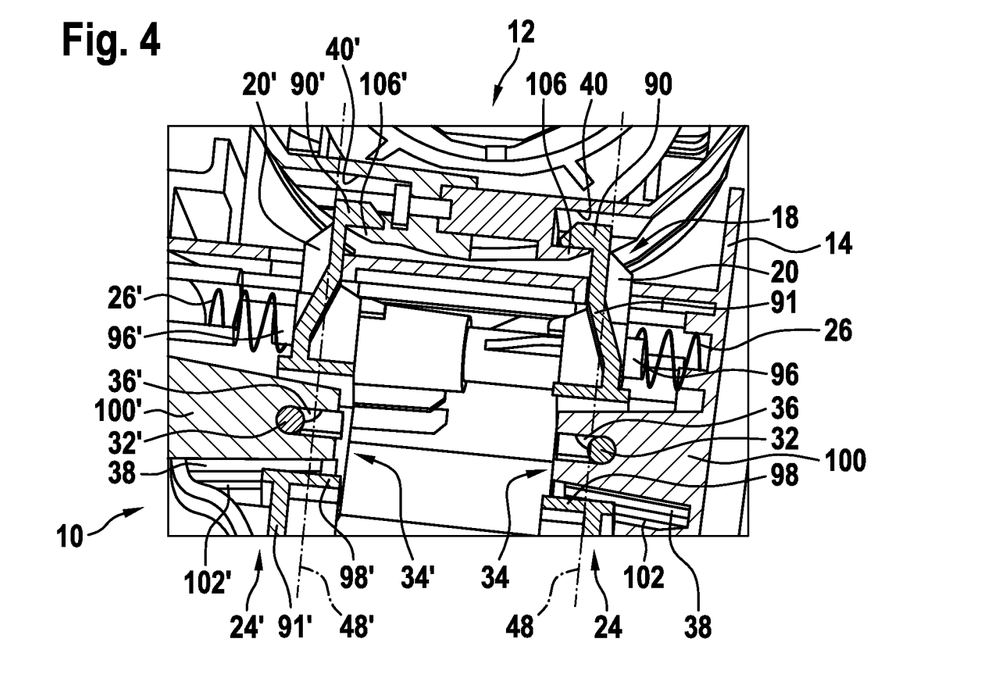
Figure 7:
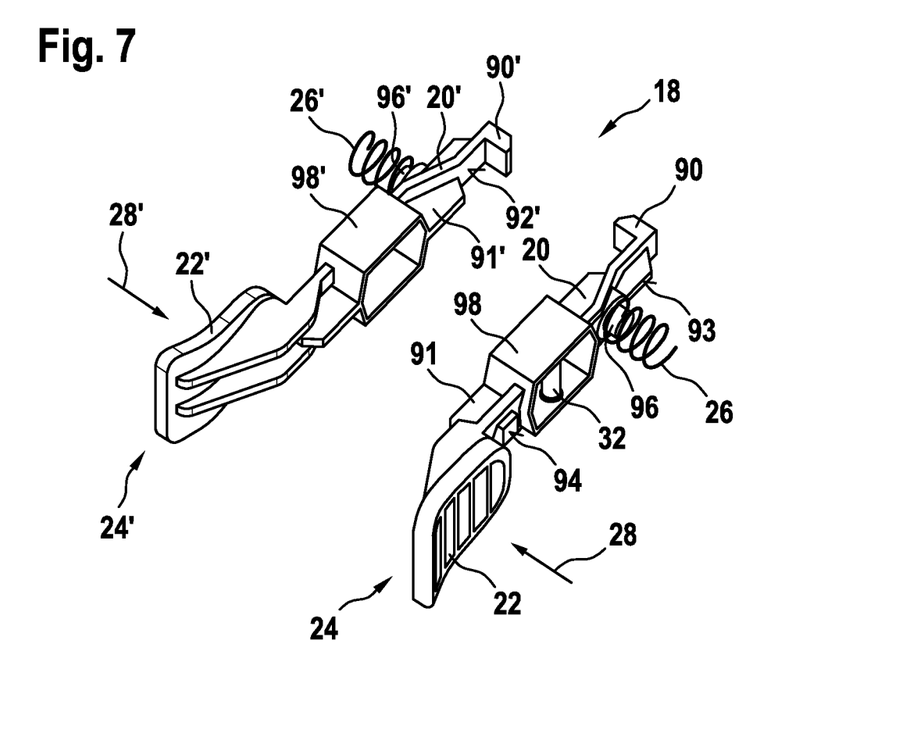

Furthermore, the suction device 10 comprises a locking unit 18 for mechanical coupling with the hand-held power tool 12. The locking unit 18 serves to releasably connect the suction device 10 to the hand-held power tool 12. The locking unit 18 comprises at least one locking element 20, 20' for direct locking with the hand-held power tool 12. The locking unit 18 comprises a locking element 20 and a further locking element 20'. The locking element 20 and the further locking element 20' each have a locking hook 90, 90', which is provided for locking to the hand-held power tool 12 to engage with a receptacle 40, 40', respectively, in the housing 58 of the hand-held power tool 12. Locking unit 18 is designed to be self-locking so that when the suction device 10 and the hand-held power tool 12 are brought together, the locking elements 20, 20' are automatically pushed apart. For automatic locking, ramps are attached to the locking hooks 90, 90', which on the side of the hand-held power tool 12 also meet a ramp geometry on the receptacles 40, 40', causing deflection of the locking levers 24, 24'. Furthermore, the locking element 20 and the further locking element 20' each comprise a base body 91, 91' with three stop surfaces 92, 92', 93, 94, with a pin 96, 96' for fixing a spring element 26, 26' and with a cage 98, 98' for receiving a rotating shaft 32, 32'. The locking element 20 and the further locking element 20' are each designed in one piece. Furthermore, the locking unit 18 comprises at least one actuating element 22, 22' for releasing the locking element 20, 20'. The locking unit 18 comprises an actuating element 22 and a further actuating element 22'. The actuating element 22 is associated with the locking element 20 and the further actuating element 22' is associated with the further locking element 20'. The actuating element 22 and the further actuating element 22' are each formed by a push button, which must be pressed for actuation, in particular in the housing 14. The actuating element 22 and the further actuating element 22' are each guided in part on a circular track. However, it would also be conceivable that the actuating element 22 and the further actuating element 22' be guided in a straight line. The actuating element 22 and the further actuating element 22' each have a corrugated actuating surface on an outer side, which serves to introduce pressure. The actuating element 22 and the further actuating element 22' are symmetrically formed.

The locking element 20 and the actuating element 22 are integrally formed, in particular as one piece, and together form a locking lever 24. The actuating element 22 is integrally connected to the locking element 20 at an end facing away from the locking hook 90. The further locking element 20' and the further actuating element 22' are integrally formed, in particular as one piece, and together form a further locking lever 24'. The further actuating element 22' is integrally connected to the further locking element 20' at an end facing away from the further locking hook 90'. The locking lever 24 and the further locking lever 24' are each exemplary formed from a one-piece plastic component. However, a different design for the locking lever 24, 24' which a skilled person regards as advantageous would also be conceivable. The locking lever 24 and the further locking lever 24' are identical in design. However, it would also be contemplated that the locking lever 24 and the further locking lever 24' are only designed in a mirror-symmetric manner. The locking lever 24 and the further locking lever 24' act independently of each other.

The locking element 20 and the further locking element 20' are each pivotally supported on the housing 14 about at least one rotating shaft 32, 32'. The locking element 20 and the further locking element 20' are each supported on opposite sides on an inner side of the housing 14 pivotally around the respective rotating shaft 32, 32' on the housing 14. The locking element 20 and the further locking element 20' are each supported on opposite sides on an inner side of the housing 14 pivotally about the respective rotating shaft 32, 32' on a respective housing shell of the housing 14. The housing 14 in particular consists of two housing shells. One rotating shaft 32 of the rotating shafts 32, 32' is integrally formed, in particular as one piece, with the locking element 20. A further rotating shaft 32' of the rotating shafts 32, 32' is integrally formed, in particular as one piece, with the further locking element 20. The rotating shafts 32, 32' are respectively arranged in the cage 98, 98' of the base body 91, 91' of the respective locking element 20, 20'. The rotating shaft 32 forms part of the locking lever 24. The further rotating shaft 32' forms part of the further locking lever 24'. The rotating shafts 32, 32' are each formed by a cylindrical component, which is provided for rotational support.

The suction device 10 further comprises a rotating shaft receptacle 34 arranged on the housing 14 for rotatably receiving the rotating shaft 32 and a further rotating shaft support 34' arranged on the housing 14 for rotatably receiving the further rotating shaft 32'. The rotating shaft receptacles 34, 34' each comprise at least one latching element 36, 36', 38, 38' for a fixation of the rotating shafts 32, 32'. The rotating shaft receptacles 34, 34' each comprise two latching elements 36, 36', 38, 38', which are provided for at least partially overlapping the rotating shafts 32, 32' of at least two sides. The rotating shafts 32, 32' are each rotatably supported between the latching elements 36, 36', 38, 38' of the rotating shaft receptacles 34, 34'. The rotating shaft receptacles 34, 34' each further comprise two fork extensions 100, 100', 102, 102', which are provided for additional guidance of the rotating shafts 32, 32'. The fork extensions 100, 100', 102, 102' are each arranged above and below the latching elements 36, 36', 38, 38' and form a slot-shaped receptacle for the rotating shafts 32, 32'. The rotating shaft receptacles 34, 34' are each arranged on opposite sides on an inner side of the housing 14. The rotating shaft receptacles 34, 34' are integrally formed, in particular as one piece, with the housing 14.

Furthermore, the locking unit 18 comprises two spring elements 26, 26', which pretension the locking lever 24 and the further locking lever 24' independently of one another. The spring elements 26, 26' are each provided to hold the locking lever 24 and the further locking lever 24' respectively in a locking position, wherein a spring force of the spring elements 26, 26' must be overcome by means of the actuating element 22 and the further actuating element 22' when the lock is released. The spring elements 26, 26' push the respective lock lever 24, 24' back to its home position.

Figure 5:
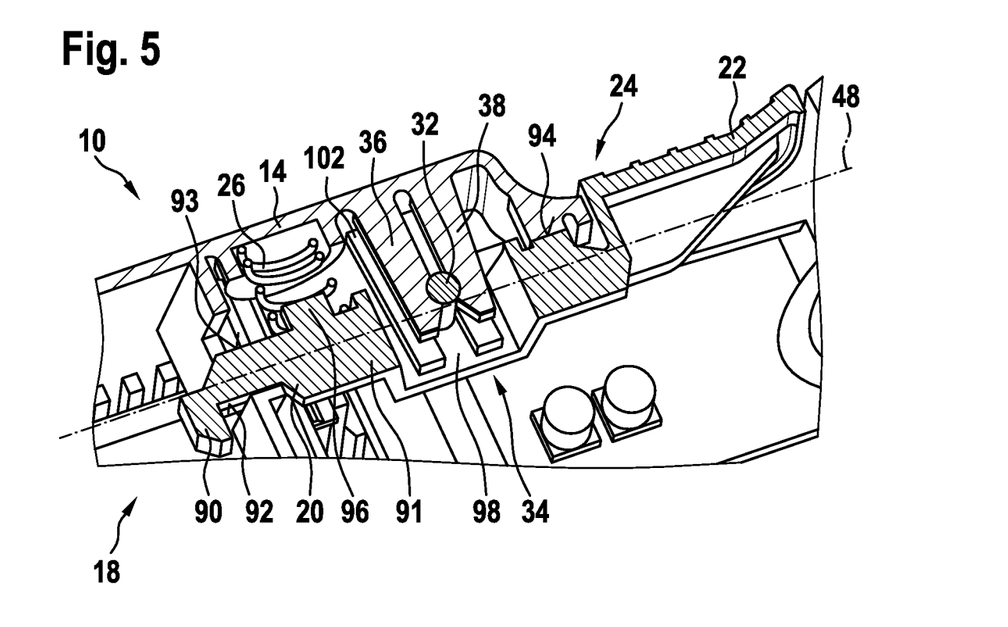
Figure 6:
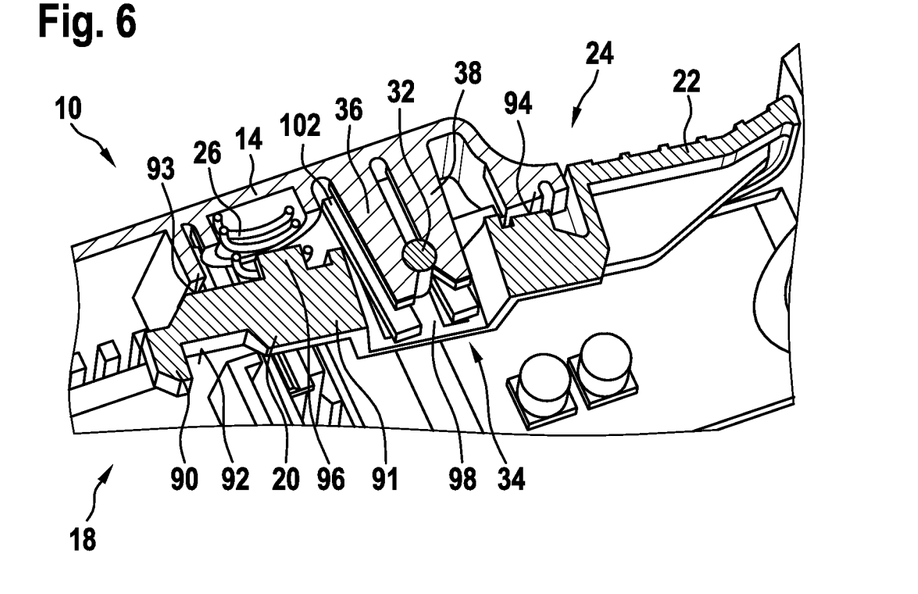

This home position is also the lock position (see FIG. 5). The deflected position is the release or also activation position (see FIG. 6). The spring elements 26, 26' are arranged between the inner wall of the housing 14 and the locking lever 24 or the further locking lever 24'. The spring elements 26, 26' are each held in a cylindrical recess on the inner wall of the housing 14. Furthermore, the spring elements 26, 26' are held on the locking lever 24 and the further locking lever 24' respectively on the pin 96, 96' of the base body 91, 91'. The spring elements 26, 26' are in particular each formed by a compression spring, in particular a coil spring. The spring elements 26, 26' are preferably slightly conically shaped to avoid buckling.

To define the individual positions of the locking levers 24, 24', the locking elements 20, 20' have end stops. These can be achieved in a variety of ways. In the initial or locking position, the locking levers 24, 24' must be limited in travel against the spring force. For this purpose, the locking elements 20, 20' comprise the stop surfaces 92, 92', 93, 94. Furthermore, geometry corresponding to the stop surfaces 92, 92', 93, 94 is provided on the housing 14 for this purpose. The stops are in this case partially realized as an insert part, whereby this is also feasible in the housing shells of the housing 14 with increased manufacturing costs.

The drive unit 16 must be arranged at least partially between the locking lever 24 and the further locking lever 24'. The locking lever 24 and the further locking lever 24' are arranged opposite each other. Preferably, the locking lever 24 and the further locking lever 24' are arranged opposite each other on an inner wall of the housing 14 of the suction device 10. The actuating element 22, 22' and/or the locking element 20, 20' are arranged at least partially adjacent the drive unit 16. The actuating element 22 and the further actuating element 22' are arranged partially adjacent the drive unit 16. The drive unit 16 is arranged between the actuating element 22 and the further actuating element 22'. There is at least one straight line that extends perpendicular to a main extension plane 104 of the suction device 10 and which intersects the actuating element 22, subsequently the drive unit 16 and then the further actuating element 22'. The locking lever 24 and the further locking lever 24' are arranged at the same position when viewed perpendicular to the main extension plane 104 of the suction device 10. The locking lever 24 and the further locking lever 24 are arranged in a mirror-symmetrical manner on opposite sides of the main extension plane 104 of the suction device 10.

The suction device 10 has a center of gravity 30. The center of gravity 30 is arranged in a region of the drive unit 16. The actuating element 22 and the further actuating element 22' are arranged in a region near the center of gravity 30.

The locking lever 24 comprises an actuating direction 28 in which the actuating element 22 is provided for actuation to release the lock. Furthermore, the further locking lever 24' comprises a further actuating direction 28' in which the further actuating element 22' is provided for actuation to release the lock. The further actuating direction 28' is at least substantially opposite to the actuating direction 28. The actuating element 22 and the further actuating element 22' must be moved towards one another in order to release the locking unit 18. The actuating element 22 and the further actuating element 22' must be compressed to release the locking unit 18. Furthermore, to release the locking unit 18, the actuating element 22 and the further actuating element 22' must be actuated simultaneously. The actuating direction 28 and the further actuating direction 28' are each aligned at least substantially perpendicular to the main extension plane 104 of the suction device 10.

The housing 58 of the hand-held power tool 12 comprises two receptacles 40, 40' for a locking receptacle of the locking elements 20, 20' of the locking unit 18 of the suction device 10. The receptacles 40, 40' are each formed by a locking pocket. The housing 58 comprises a receptacle 40 for receiving the locking hook 90 of the locking element 20 of the locking unit 18 of the suction device 10. Furthermore, the housing 58 comprises a further receptacle 40' for a receptacle of the further locking hook 90' of the further locking element 20' of the locking unit 18 of the suction device 10. The receptacles 40, 40' are arranged on a front side of the hand-held power tool 12 and are opened at least partially to one side. The receptacles 40, 40' are each formed by rectangular recesses extending from both sides into the housing 58 of the hand-held power tool 12. The receptacles 40, 40' each form a locking wall 106, 106', which is gripped behind by the locking hook 90 of the locking element 20 and the further locking hook 90' of the further locking element 20' in a locked state.

Figure 2:
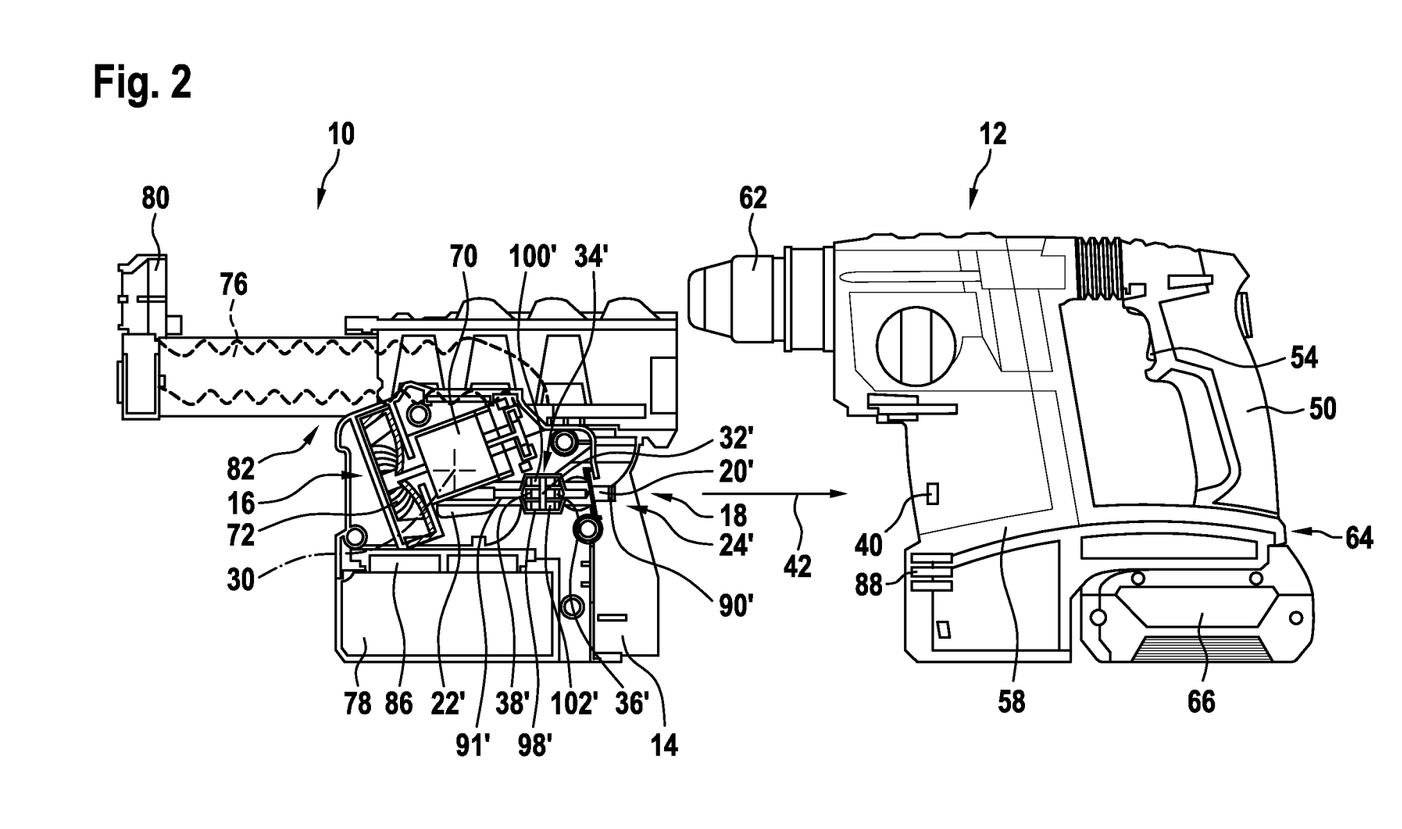

The suction device 10 is couplable to the hand-held power tool 12 in a defined connection direction 42. The connection direction 42 extends at least substantially parallel to the tool rotational axis 44 of the hand-held power tool 12. The suction device 10 is attached on the hand-held power tool 12 from the front.

The suction device 10 further comprises an actuating plane 46, which is subtended by a main extension direction 48 of the locking lever 24 and a main extension direction 48' of the further locking lever 24' and which extends through the handle 50 of the hand-held power tool 12. The actuating plane 46 extends perpendicular to the main extension plane 104 of the suction device 10. Furthermore, an axis of the handle 50 of the hand-held power tool 12 extends in the main extension plane 104 of the suction device 10 and at least substantially perpendicular to the actuating plane 46 of the suction device 10. The actuating plane 46 of the suction device 10 extends parallel to the tool rotational axis 44 of the hand-held power tool 12. The locking unit 18 is therefore positioned so that it is in alignment with the handle 50 on the hand-held power tool 12 and thus enables very ergonomic activation and handling. The hand-held power tool 12 comprises an actuating plane 52, which extends parallel to the actuating plane 46 of the suction device 10 and which extends through the operation switch 54 of the hand-held power tool 12. A minimum distance 56 between the actuating plane 52 of the hand-held power tool 12 and the actuating plane 46 of the suction device 10 is less than 150 mm. Preferably, a minimum distance between the actuating plane 52 of the hand-held power tool 12 and the actuating plane 46 of the suction device 10 is less than 100 mm and greater than 50 mm. By way of example, a minimum distance between the actuating plane 52 of the hand-held power tool 12 and the actuating plane 46 of the suction device 10 is at least approximately 80 mm. The actuating plane 52 of the hand-held power tool 12 extends perpendicular to a main extension plane of the hand-held power tool 12. Furthermore, an axis of the handle 50 of the hand-held power tool 12 extends in the main extension plane of the hand-held power tool 12 and at least substantially perpendicular to the actuating plane 52 of the hand-held power tool 12. The actuating plane 52 of the hand-held power tool 12 extends parallel to the tool rotational axis 44 of the hand-held power tool 12.

Figure 8:
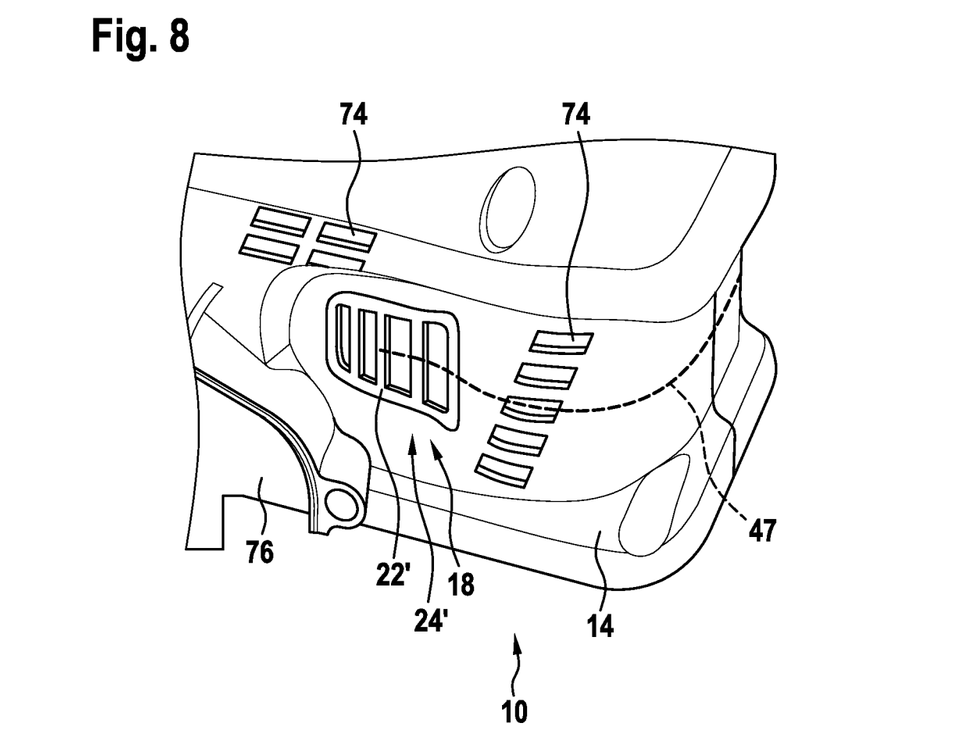

The housing 14 in the actuating plane 46, which is subtended by a main extension direction 48 of the locking lever 24 and the main extension direction 48' of the further locking lever 24', comprises a gripping length 47 (FIG. 8) between the actuating element 22 and the further actuating element 22', which gripping length is a maximum of 170 mm. The gripping length 47 is a maximum of 160 mm, preferably a maximum of 155 mm. The gripping length 47 is at least 120 mm, preferably at least 130 mm, and more preferably at least 140 mm. The gripping length 47 is, e.g., approximately 150 mm. The gripping length 47 defines a length of a line following the outer contour of the housing 14, which extends from the actuating element 22 to the further actuating element 22' in the actuating plane 47 along the shortest path. Preferably, an operator's hand rests against the housing 14 when the locking unit 18 is released along the line.

The invention claimed is:

1. A suction device for a releasable connection to a hand-held power tool, the device comprising:
   a housing;
   a drive unit arranged in the housing and configured to generate a suction flow; and
   at least one locking unit configured to mechanically couple with the hand-held power tool, the locking unit comprising:
      at least one locking element configured to directly lock with the hand-held power tool;
      at least one actuating element configured to release the lock of the at least one locking element;
      a further locking element configured to directly lock with the hand-held power tool; and
      a further actuating element configured to release the lock of the further locking element,
   wherein at least one of the actuating element and the locking element is arranged at least partially adjacent to the drive unit,
   wherein the locking element and the actuating element are integrally formed and together form a locking lever,
   wherein the further locking element and the further actuating element are integrally formed and together form a further locking lever, and
   wherein the locking unit comprises at least two spring elements that pretension the locking lever and the further locking lever independently of each other.

2. The suction device according to claim 1, wherein the drive unit is at least partially arranged between the locking lever and the further locking lever.

3. The suction device according to claim 1, wherein the suction device defines a center of gravity, and the at least one actuating element is arranged in a region near the center of gravity.

4. A hand-held power tool system comprising:
   the suction device according to claim 1; and
   the hand-held power tool, which comprises at least one housing having at least one receptacle configured to receive and lock the at least one locking element of the locking unit of the suction device.

5. The hand-held power tool system according to claim 4, wherein the suction device is configured to couple to the hand-held power tool in a defined connection direction, which extends at least substantially parallel to a tool rotational axis of the hand-held power tool.

6. The hand-held power tool system according to claim 4, wherein the suction device defines an actuating plane, which is subtended by a main extension direction of the locking lever and a main extension direction of the further locking lever and which extends through a handle of the hand-held power tool.

7. The hand-held power tool system according to claim 6, wherein:
   the hand-held power tool defines a tool actuating plane, which extends parallel to the actuating plane of the suction device and which extends through an operation switch of the hand-held power tool, and
   a minimum distance between the tool actuating plane and the actuating plane of the suction device is less than 150 mm.

8. The hand-held power tool system according to claim 4, wherein the hand-held power tool is a hammer drill.

9. The suction device according to claim 1, wherein the suction device defines a center of gravity, and the at least one actuating element is arranged in a region near the center of gravity.

10. A suction device for a releasable connection to a hand-held power tool, the device comprising:
    a housing;
    a drive unit arranged in the housing and configured to generate a suction flow; and
    at least one locking unit configured to mechanically couple with the hand-held power tool, the locking unit comprising:
       at least one locking element configured to directly lock with the hand-held power tool; and
       at least one actuating element configured to release the lock of the at least one locking element,
    wherein at least one of the actuating element and the locking element is arranged at least partially adjacent to the drive unit,
    wherein the locking element and the actuating element are integrally formed and together form a locking lever, and
    wherein the at least one locking element is pivotally supported on the housing around at least one rotating shaft.

11. The suction device according to claim 10, wherein the rotating shaft is formed integrally with the locking element.

12. The suction device according to claim 10, further comprising:
    a rotating shaft receptacle arranged on the housing and configured to rotatably receive the rotating shaft, the rotating shaft receptacle comprising at least one latching element for fixing the rotating shaft.

13. The suction device according to claim 10, wherein the locking unit further comprises:
    a further locking element configured to directly lock with the hand-held power tool; and
    a further actuating element configured to release the lock of the further locking element,
    wherein the further locking element and the further actuating element are integrally formed and together form a further locking lever.

14. The suction device according to claim 13, wherein the housing defines a gripping length in an actuating plane between the actuating element and the further actuating element, the gripping length being subtended by a main extension direction of the locking lever and a main extension direction of the further locking lever, the gripping length being at most 170 mm.

15. The suction device according to claim 13, wherein the locking unit comprises at least two spring elements that pretension the locking lever and the further locking lever independently of each other.

16. A suction device for a releasable connection to a hand-held power tool, the device comprising:
- a housing;
- a drive unit arranged in the housing and configured to generate a suction flow; and
- at least one locking unit configured to mechanically couple with the hand-held power tool, the locking unit comprising:
  - at least one locking element configured to directly lock with the hand-held power tool;
  - at least one actuating element configured to release the lock of the at least one locking element;
  - a further locking element configured to directly lock with the hand-held power tool; and
  - a further actuating element configured to release the lock of the further locking element, wherein:
- at least one of the actuating element and the locking element is arranged at least partially adjacent to the drive unit,
- the locking element and the actuating element are integrally formed and together form a locking lever,
- the further locking element and the further actuating element are integrally formed and together form a further locking lever,
- the locking lever is configured to be actuated in an actuating direction to unlock the locking element,
- the further locking lever is configured to be actuated in a further actuating direction to unlock the further locking element, and
- the further actuating direction is at least substantially opposite to the actuating direction.

17. The suction device according to claim 16, wherein the drive unit is at least partially arranged between the locking lever and the further locking lever.

18. A hand-held power tool system comprising:
- the suction device according to claim 16; and
- the hand-held power tool, which comprises at least one housing having at least one receptacle configured to receive and lock the at least one locking element of the locking unit of the suction device.

19. The suction device according to claim 16, wherein the suction device defines a center of gravity, and the at least one actuating element is arranged in a region near the center of gravity.

20. A hand-held power tool system comprising:
- the suction device according to claim 8; and
- the hand-held power tool, which comprises at least one housing having at least one receptacle configured to receive and lock the at least one locking element of the locking unit of the suction device.

* * * * *